May 28, 1963 D. L. THOMAS 3,091,430
VARIABLE SPEED TRANSMISSION
Filed Sept. 25, 1961 2 Sheets-Sheet 1

INVENTOR.
DONALD L. THOMAS
BY
Mead, Browne, Schuyler & Beveridge
ATTORNEYS.

May 28, 1963 D. L. THOMAS 3,091,430
VARIABLE SPEED TRANSMISSION
Filed Sept. 25, 1961 2 Sheets-Sheet 2
FIG. 3
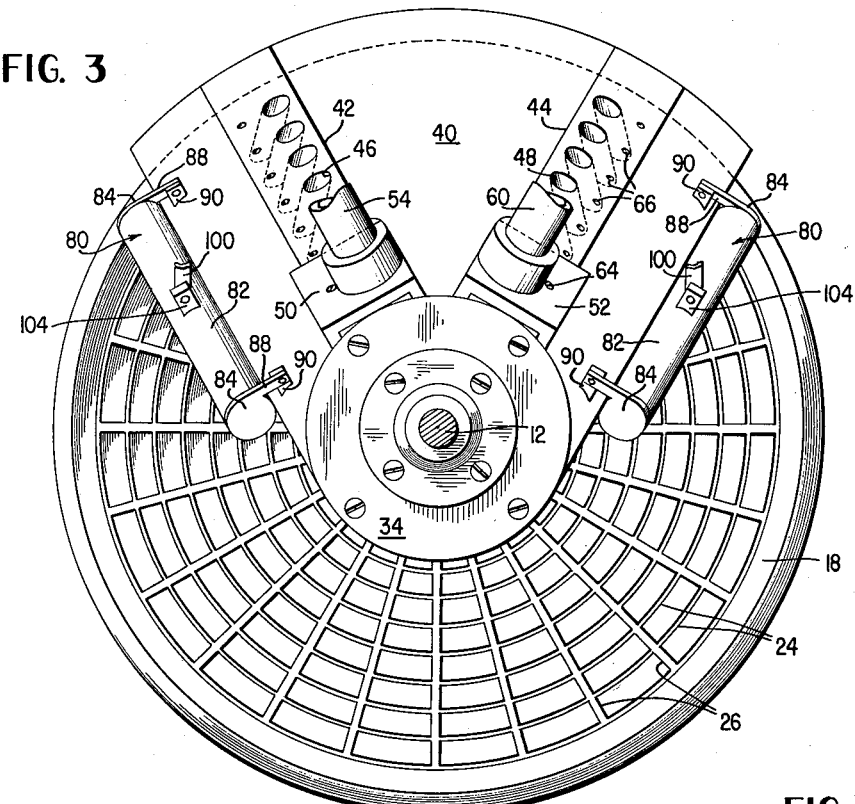
FIG. 4
FIG. 5
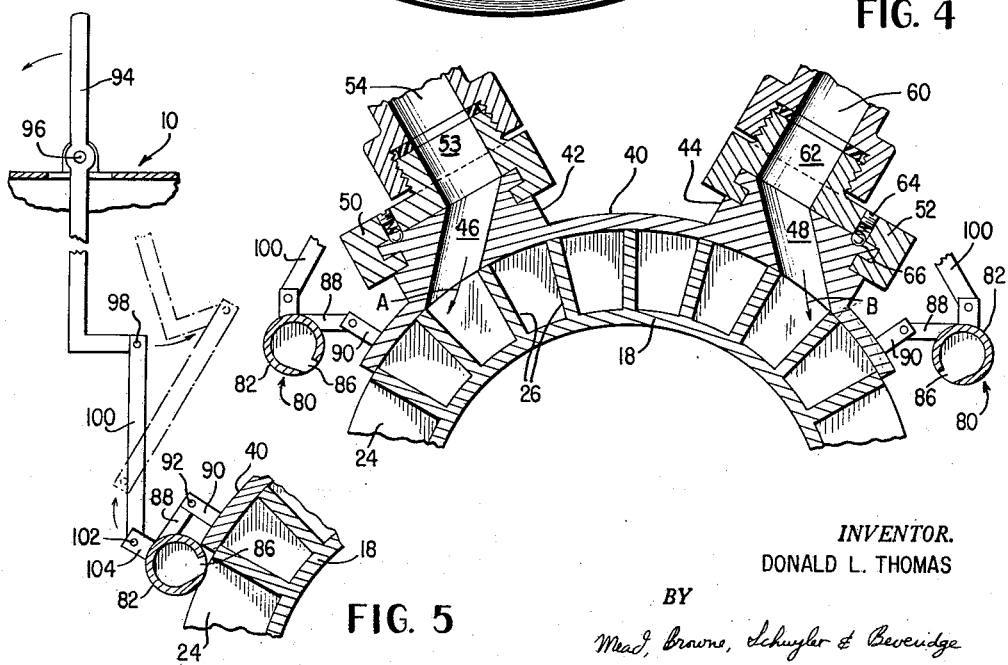
INVENTOR.
DONALD L. THOMAS
BY
Mead, Browne, Schuyler & Beveridge
ATTORNEYS.

United States Patent Office 3,091,430
Patented May 28, 1963

3,091,430
VARIABLE SPEED TRANSMISSION
Donald L. Thomas, 513 S. Elm St., New London, Iowa
Filed Sept. 25, 1961, Ser. No. 140,385
4 Claims. (Cl. 253—137)

This invention relates to variable speed transmissions, and more particularly to a reversible fluid actuated variable speed power transmission.

It is a primary object of the invention to provide a fluid actuated variable speed transmission wherein a single transmission member may be driven in either direction of rotation over a wide range of speeds, and wherein reversal of direction of rotation is readily achieved.

Still another object of the invention is to provide a variable speed transmission which may be readily manufactured, and wherein a high degree of manufacturing precision is not required.

The foregoing, and other objects, are achieved in a transmission wherein the driven member includes a frusto-conical member supported about its axis and formed with a plurality of series of circumferentially extending pockets in its outer periphery. A portion of the peripheral surface of the frusto-conical member is disposed in sliding engagement with the inner surface of a cover plate upon which a pair of fluid distributing members are supported. Tangentially inclined passages in the cover plate are located in alignment with the respective series of pockets. By locating the distributor in fluid communication with a selected passage, fluid, such as oil under high pressure, is discharged tangentially into the pockets and, by virtue of the tangential direction of discharge, drives the frusto-conical member in rotation.

Variation in speed is readily achieved by shifting the distributor to discharge into series of pockets lying at a greater or lesser distance from the axis of rotation. Reversal of direction is readily achieved by providing two series of passages through the cover plate, one series of passages being inclined tangentially in a direction opposite to the tangential inclination of the other series. Flexible conduits connected to the respective distributors are connected to a three-way valve which couples the conduits to a pressure source so that fluid under pressure from the source may be selectively diverted into one or the other of the conduits in accordance with the desired direction of rotation.

Other objects and features of the invention will become apparent by reference to the following specification and to the drawings.

In the drawings:

FIG. 3 is an end view, partially in section, showing details of the frusto-conical transmission member and guide element, with certain elements omitted;

FIG. 4 is a detail cross-sectional view taken on line 4—4 of FIG. 2; and

FIG. 5 is a detail cross-sectional view of the brake mechanism.

Figure 1:
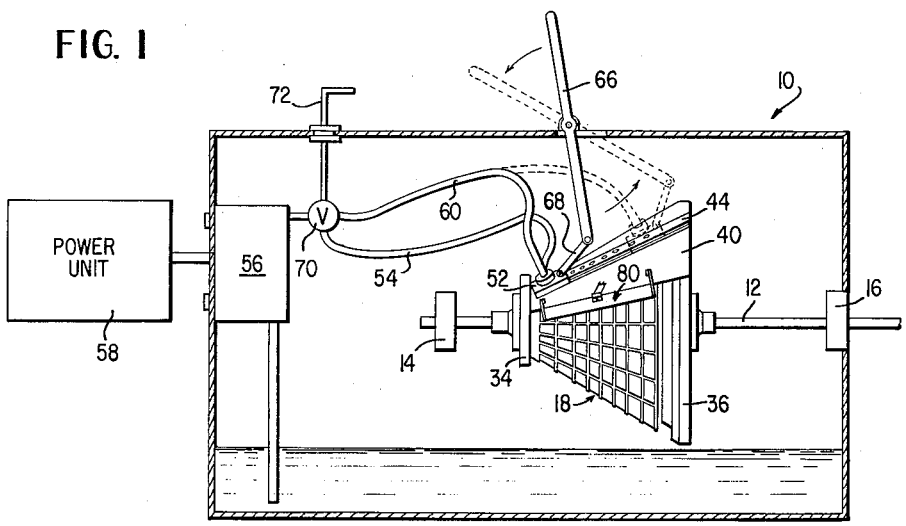
FIG. 1 is an overall view, partially schematic and partially in section, of a variable speed transmission embodying the present invention.
Figure 2:
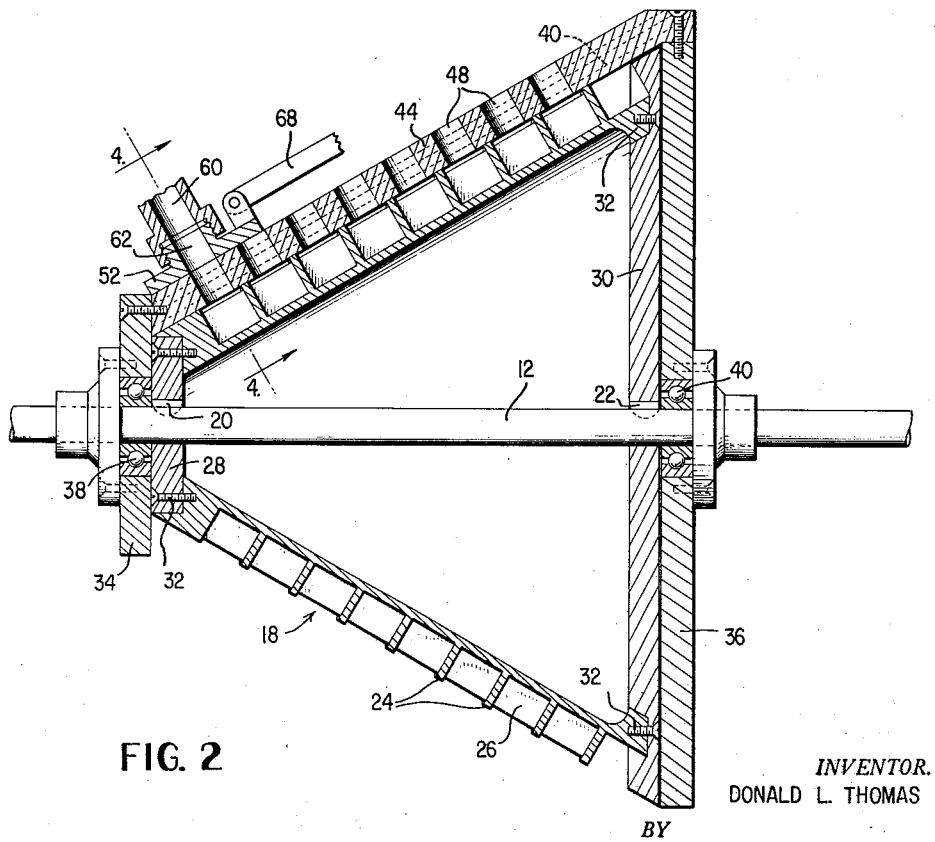
FIG. 2 is an enlarged partial cross-sectional view of the structure of FIG. 1.

Referring first to FIG. 1, one form of transmission embodying the invention is shown as including a closed housing designated generally 10 within which a shaft 12 is rotatably supported as by bearing assemblies 14 and 16 and projects from housing 10 through a suitable seal of conventional construction which may be associated with bearing 16. A frusto-conical transmission member 18 is coaxially mounted upon shaft 12 and coupled to the shaft for rotation with the shaft as by keys 20 and 22.

The outer peripheral surface of frusto-conical member 18 is divided into a plurality of circumferentially extending annular grooves by a plurality of uniformly spaced annular webs 24. Each of the grooves defined by adjacent webs 24 is further divided into a plurality of pockets by radial vanes 26 which, as best seen in FIG. 3, lie in radial planes and extend axially across the grooves defined by circumferential webs 24. The frusto-conical shell portion of member 18 is supported upon shaft 12 as by circular end plates 28 and 30 which are fixedly secured to the apex and base respectively as by bolts 32. Keys 20 and 22 respectively lock members 28 and 30 against rotation relative to shaft 12.

Frusto-conical member 18 is held against axial movement relative to shaft 12 by fixed circular plates 34 and 36 respectively within which shaft 12 is rotatably journaled as by bearing assemblies 38 and 40 respectively. Plates 34 and 36 are fixedly secured to housing 10 by any suitable means, not shown, and remain stationary. Between plates 34 and 36, a cover plate 40, complementary in shape to the outer peripheral surface of frusto-conical member 18 is fixedly supported and, as best seen in FIG. 3, extends partially around the circumference of frusto-conical member 18. The inner surface of member 40 is in sliding engagement with the outer surface of member 18.

As best seen in FIGS. 3 and 4, the outer side of member 40 is formed with a pair of raised guide portions 42 and 44 respectively which extend in a direction such that the longitudinal center lines of guide portions 42 and 44 lie in respective planes common with the axis of shaft 12. Each of guide portions 42 and 44 are formed with a plurality of bores such as 46 and 48, the number of bores 46 and 48 each corresponding to the number of circumferential grooves defined by webs 24 on frusto-conical member 18. Each bore 46 is aligned with one circumferential groove in member 18, as in each bore 48.

As best seen in FIG. 4, each bore 46 is inclined tangentially of frusto-conical member 18 in one direction, while the corresponding bore 48 in the opposite guide portion 44 is inclined tangentially of member 18 in the opposite direction.

A distributor member 50 is slidably supported upon guide portion 42 is movement longitudinally along a guide portion. A similar distributor 52 is slidably supported upon guide portion 44. Distributor member 50 is bored as at 53 and provided with a coupling section by means of which bore 53 is placed in fluid communication with a flexible conduit 54. Conduit 54, as best seen in FIG. 1, is connected to a source of fluid pressure which, in the disclosed embodiment, takes the form of a conventional oil pump 56 which is driven from a suitable power source 58 located externally of housing 10. A second flexible conduit 60 is connected to distributor 52 which is likewise provided with a bore 62 operable to place conduit 60 in communication with one of passages 48 through guide portions 44. Sliding movement of distributors 50 and 52 longitudially along their respective guide portions 42 and 44 is employed to selectively place conduits 54 and 60 in communication with a selected one of passages 46 and 48. To accurately locate the distributors with their respective bores 52 and 62 in alignment with a bore 46 or 48, the distributors may be provided with a spring loaded ball detent such as 64 which can engage suitably located depression 66 on guide portions 42 or 44.

Distributors 50 and 52 are shifted concurrently along their respective guide portions by any suitable structure which, in the form illustrated, may take the form of a pivoted lever 66 and link 68 connection. Preferably, conduits 54 and 60 are commonly connected to the output of pump 56 through a manually actuated three-way valve designated generally 70 which may be operated externally of housing 10 by a suitably sealed actuating shaft 72 to selectively connect only one of conduits 54 or 60 to the output of pump 56.

Referring now to FIG. 4, if three-way valve 70 is actuated to connect conduit 54 to the output of pump 56, the output of pump 56 is discharged from passage 46 in the form of a generally tangentially directed stream of fluid in approximately the path designated by the arrow A of FIG. 4. The discharge stream of high pressure fluid impinges against radial vanes 26 of frusto-conical member 18 and the tangentially directed impinging stream drives frusto-conical member 18 in a counter-clockwise direction as viewed in FIG. 4 when conduit 54 is connected to the output of pump 56. To reverse the direction of rotation, the three-way valve 70 is actuated to transfer the output of pump 56 to flexible conduit 60. As seen in FIG. 4, when conduit 60 is connected to the output of pump 56, a tangentially directed stream of fluid under pressure is discharged from passage 48 to impinge on radial vanes 26 in a fashion driving frusto-conical member 18 in a clockwise direction as viewed in FIG. 4. Thus, reversal of direction of rotation is achieved simply by manually actuating three-way valve 70 to selectively divert the output of pump 56 either to conduit 54 or to conduit 60.

Assuming a constant output of pump 56, the speed of rotation of shaft 12 is varied in accordance with the positioning of the distributor longitudinally along its respective guide portions. When fluid is discharged into a circumferential groove in frusto-conical member 18 of relatively small diameter, the rotative speed of shaft 12 is relatively high with a relatively low power output. By locating the distributor to discharge into a circumferential groove of relatively large diameter—i.e., near the base or large diameter end of frusto-conical member 18—a relatively low speed with high power output 12 is obtained.

To assist in braking rotation of shaft 12, the transmission may be provided with an auxiliary brake assembly designated generally 80 shown in FIGS. 3 and 5. Brake assembly 80 is intended to supplement the action of a main brake, not shown, applied to shaft 12 and includes an elongate hollow cylindrical member 82 closed at both ends as by end plates 84. As best seen in FIG. 5, cylindrical member is provided with an elongate slot or opening 86 which extends the entire length of member 82, the length of member 82 in turn being sufficient to overlap all of the circumferential grooves defined by webs 24. Projecting arms 88 fixedly secured to or integral with the end plates 84 are employed to pivotally support member 82 upon pivot blocks 90 fixedly mounted upon guide element 40, a pivot pin 92 interconnecting the ends of arms 88 to the respective blocks 90. An actuating lever 94 is pivotally mounted as by pivot 96 upon housing 10 and projects into the interior of the housing. The lower end of lever 94 is connected, as by pivot 98 to an actuating link 100 which is in turn pivotally connected to cylindrical member 82 as by a pivot 102 in a block 104 fixedly mounted on member 82.

With actuating lever 94 in full line position of FIG. 5, member 82 is located as shown in FIG. 5 with slot 86 located to receive fluid from the pockets in member 18 as rotation of member 18 carries the pockets outwardly beyond the left-hand edge of member 40 as viewed in FIG. 5. The centrifugal force imparted to the fluid by rotation of member 18 causes the fluid to pass inwardly through slot 86 into the interior of member 82. Since only one circumferential series of pockets receives oil from the distributor at one time, the oil from this series of pockets passes axially along the interior of member 82 and is discharged through the open slot 86 to impinge on the advancing radial vanes of all of the circumferential series of pockets. This action creates a slow, but steady, braking effect upon the rotation of shaft 12.

When the transmission is running in a normal or unbraked condition, actuating lever 94 is located in the broken line position of FIG. 5, this location of lever 94 swinging cylindrical member 82 upwardly about pivot 92 to a location clear of the path of fluid discharged from the pockets upon rotation of member 18.

While one exemplary embodiment of the invention has been described, it will be apparent to those skilled in the art the disclosed embodiment may be modified. Therefore, the foregoing description is to be considered exemplary rather than limiting, and the true scope of the invention is that defined in the following claims.

I claim:

1. A variable speed drive comprising a housing, a frusto-conical transmission member mounted within said housing for rotation about its axis, said transmission member having a plurality of circumferentially extending annular grooves in its outer periphery and a plurality of radial vanes extending axially across each groove to divide each groove into a circumferentially extending series of pockets, a stationary guide element complementary in shape to the outer surface of said frusto-conical member mounted in said housing and overlying a portion of a peripheral surface of said frusto-conical member in sliding engagement therewith, said guide element having a pair of guide members thereon, each guide member extending in a direction normal to the circumferential extent of said grooves from one end of said frusto-conical member to the other, a distributor member mounted on each of said guide elements for sliding movement on the guide element, means for sliding said distributors along their respective guide elements to locate the distributors in alignment with a selected one of said circumferential grooves in said frusto-conical member, and nozzle means in said guide members for discharging a generally tangential stream of fluid under pressure from one of said distributors into the circumferentially extending series of pockets aligned therewith to thereby drive said frusto-conical member in rotation about its axis.

2. A variable speed drive as defined in claim 1 wherein the tangential direction of the stream of fluid discharged from the nozzle means in one of said guide members is opposite to the tangential direction in which fluid is discharged from the nozzle means in the other of said guide members, a source of fluid under pressure, and means for selectively connecting said source of fluid under pressure to said one or to said other of said distributors to thereby determine the direction of rotation of said frusto-conical member.

3. A variable speed drive comprising a housing, a frusto-conical member mounted within said housing for rotation about its axis, said frusto-conical member having a plurality of circumferentially extending annular grooves in its outer periphery and a plurality of radial vanes extending axially across each groove to divide each groove into a circumferentially extending series of pockets, a stationary guide element fixedly mounted in said housing in axially overlapping relationship with said frusto-conical member, said guide element being complementary in shape to the outer periphery of said frusto-conical member and extending partially around the circumference of said frusto-conical member in sliding engagement therewith, a distributor member slidably mounted upon said guide element for movement along a path normal to the circumferential extent of said grooves in said frusto-conical member, a plurality of tangentially inclined passages extending through said guide element from the path of movement of said distributor, each of said passages being aligned with one of said circumferential grooves and being inclined in a direction substantially normal to the radial vanes in said groove, said distributor having a bore therein, means for moving said distributor along said path to locate said bore in said distributor in communication with a selected one of said passages in said guide element, a source of fluid under pressure, and means for selectively connecting said source to said bore in said distributor to thereby discharge a tangentially directed stream of fluid under pressure from the passage in communication with said bore into the circumferentially extending series of pockets aligned therewith to drive said frusto-conical member in rotation within said housing.

4. A variable speed drive as defined in claim 3 further comprising a brake element mounted upon the edge of said guide element toward which said tangentially directed stream of fluid is discharged, and means for moving said brake element into or out of the path of fluid discharged by said pockets upon rotation of said pockets beyond said edge of said guide element.

References Cited in the file of this patent
UNITED STATES PATENTS

| | | |
|---|---|---|
| 624,814 | Jackson | May 9, 1899 |
| 832,100 | Tingley | Oct. 2, 1906 |
| 900,342 | Ashley | Oct. 6, 1908 |
| 901,385 | Rowan et al. | Oct. 20, 1908 |
| 1,043,480 | Sundh | Nov. 5, 1912 |